United States Patent
Banerjee et al.

(10) Patent No.: US 11,733,386 B2
(45) Date of Patent: Aug. 22, 2023

(54) METHODS AND APPARATUSES FOR OBJECT DETECTION IN A SCENE BASED ON LIDAR DATA AND RADAR DATA OF THE SCENE

(71) Applicant: Bayerische Motoren Werke Aktiengesellschaft, Munich (DE)

(72) Inventors: Koyel Banerjee, San Jose, CA (US); Sumanth Nirmal Gavarraju, San Jose, CA (US); Mingkang He, Baltimore, MD (US)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 191 days.

(21) Appl. No.: 16/767,653

(22) PCT Filed: Nov. 22, 2018

(86) PCT No.: PCT/EP2018/082145
§ 371 (c)(1),
(2) Date: May 28, 2020

(87) PCT Pub. No.: WO2019/154536
PCT Pub. Date: Aug. 15, 2019

(65) Prior Publication Data
US 2020/0301013 A1    Sep. 24, 2020

(30) Foreign Application Priority Data

Feb. 9, 2018    (EP) .................................... 18155945

(51) Int. Cl.
*G01S 13/931*    (2020.01)
*G01S 17/86*    (2020.01)
(Continued)

(52) U.S. Cl.
CPC ............ *G01S 17/86* (2020.01); *G01S 13/865* (2013.01); *G01S 13/931* (2013.01);
(Continued)

(58) Field of Classification Search
CPC ...... G01S 13/42; G01S 13/865; G01S 13/867; G01S 13/931; G01S 17/42; G01S 17/86;
(Continued)

(56) References Cited

U.S. PATENT DOCUMENTS

2009/0213694 A1*   8/2009   Zott .................... B60R 21/0134
                                                                 367/95
2014/0303845 A1*   10/2014   Hartmann ............. B60W 10/20
                                                                 701/41

(Continued)

OTHER PUBLICATIONS

International Search Report (PCT/ISA/210) issued in PCT Application No. PCT/EP2018/082145 dated Apr. 2, 2019 (five pages).

(Continued)

*Primary Examiner* — Timothy A Brainard
(74) *Attorney, Agent, or Firm* — Crowell & Moring LLP

(57) ABSTRACT

Object detection in a scene is based on lidar data and radar data of the scene. The lidar data and the radar data are transformed to a common coordinate system. Different radar point clusters are extracted from the radar data. Different lidar point clusters are extracted from the lidar data and each lidar point cluster is associated with a target object. A target object's velocity is estimated based on the movement of the respective lidar point cluster between consecutive lidar images. The estimated target object's velocity is compared with velocity information of a corresponding radar point cluster to identify corresponding radar and lidar point clusters.

11 Claims, 13 Drawing Sheets

(a) HLF Architecture (b) LLF Architecture

(51) Int. Cl.
 *G01S 17/931* (2020.01)
 *G01S 13/86* (2006.01)
(52) U.S. Cl.
 CPC ... *G01S 17/931* (2020.01); *G01S 2013/93271* (2020.01); *G01S 2013/93275* (2020.01)
(58) Field of Classification Search
 CPC .................. G01S 17/87; G01S 17/931; G01S 2013/93271; G01S 2013/93275; G01S 7/4808
 See application file for complete search history.

(56) References Cited

U.S. PATENT DOCUMENTS

| | | |
|---|---|---|
| 2015/0098076 A1 | 4/2015 | Oh et al. |
| 2016/0110878 A1* | 4/2016 | Chang ................. G06V 10/42 |
| | | 382/103 |
| 2017/0032222 A1* | 2/2017 | Sharma ............... G06K 9/6232 |
| 2017/0248693 A1* | 8/2017 | Kim ..................... G01S 13/865 |
| 2017/0371348 A1* | 12/2017 | Mou ..................... G01S 17/87 |
| 2019/0154835 A1* | 5/2019 | Maleki ................. G01S 17/34 |

OTHER PUBLICATIONS

Written Opinion (PCT/ISA/237) issued in PCT Application No. PCT/EP2018/082145 dated Apr. 2, 2019 (nine pages).
European Search Report issued in European Application No. 18155945.1 dated Oct. 31, 2018 (10 pages).

* cited by examiner

FIG. 1
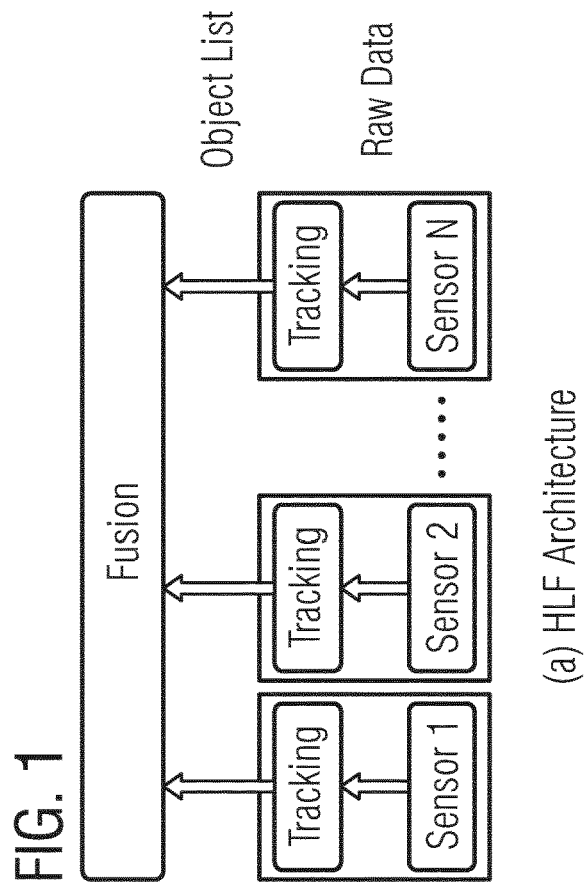
(a) HLF Architecture
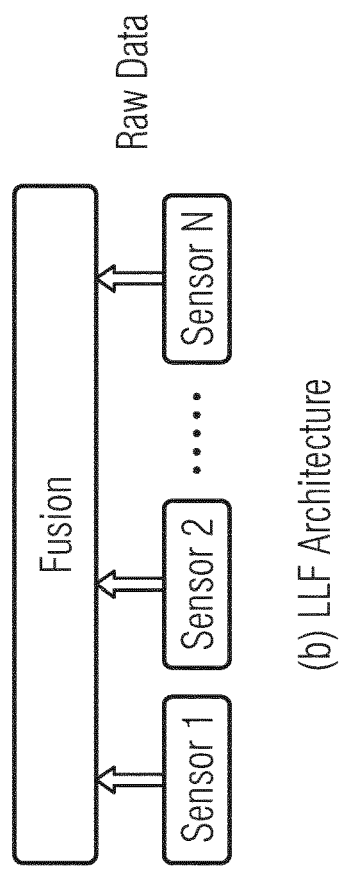
(b) LLF Architecture

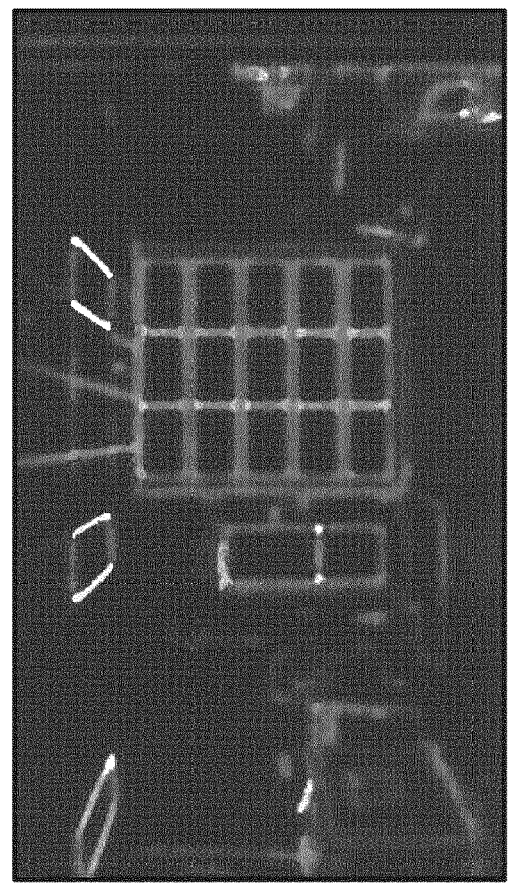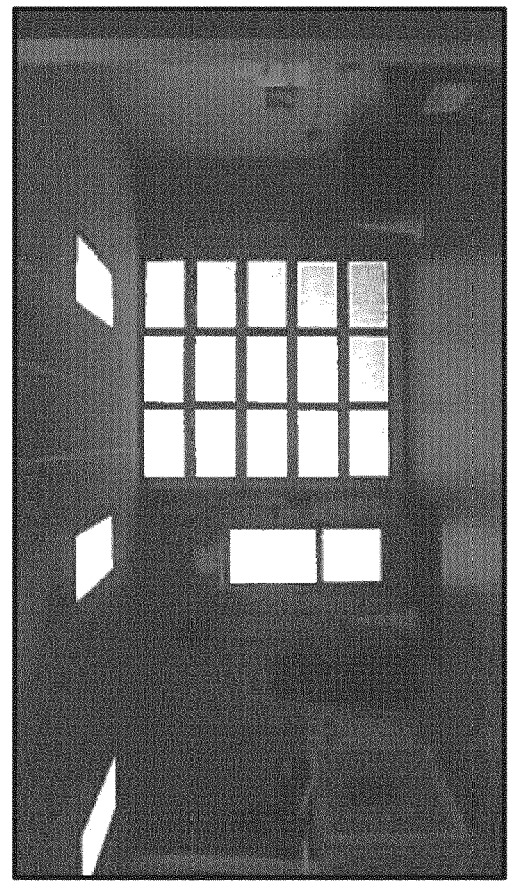
FIG. 5

METHODS AND APPARATUSES FOR OBJECT DETECTION IN A SCENE BASED ON LIDAR DATA AND RADAR DATA OF THE SCENE

FIELD

The present disclosure generally relates to the technical field of environmental sensors and, more particularly, to object detection and/or classification based on fused sensor data of different sensors.

BACKGROUND

For example, autonomous cars rely on a variety of sensors to perceive their environment. In order to build a consistent model of their surrounding world, which is needed to act safely in it, the data of the different sensors can be fused. Each type of sensor comes with its own strengths and weaknesses. Cameras, for example, can perceive color and texture information from the world and are good at classifying objects. However, their detection range is limited and they perform poorly in limited lighting or adverse weather conditions. LiDARs (Light Detection And Ranging) provide precise distance information, have ranges that can exceed 100 m and are able to detect small objects. They also work well at night but do not provide color information and their performance decreases in heavy rain. Radars (radio detection and ranging) provide precise distance and velocity information and work well in inclement weather conditions but have a rather low resolution.

Sensor fusion can broadly be divided into three main categories: low-level sensor fusion (LLF), mid-level fusion (MLF), and high-level sensor fusion (HLF). HLF detects objects with each sensor separately and subsequently fuses these detections. Hence, object detections are made locally with limited available information. HLF has been the most popular fusion technique with car OEMs (Original Equipment Manufacturer) mainly because it uses the vendors supplied object list of the sensors and integrates them into an environment model. However since the sensors are not calibrated against each other this method causes ringing, aberrations and duplicate objects. One way to prevent the occurrence of these issues is the fusion of raw sensor data. This is called LLF. LLF is intrinsically complex and comes with several challenges. An accurate extrinsic calibration of the sensors is needed to correctly overlay their perceptions of the environment. In addition, the sensor recordings need to be time-synchronized, speed-synchronized and compensated for ego-motion. The sensors also have different fields of views and models need to be trained with the multi-modal input data and the fusion and detection algorithms need to be capable to run in real-time. FIGS. 1a, b schematically show HLF and LLF data fusion architectures. In HLF, detection algorithms are run on each sensor to generate object lists, which are then fed into a fusion module, where the object lists are fused. In LLF, raw data from sensors is fused in the fusion module. Detection happens after this on the fused data. MLF is an abstraction sitting on top of LLF where extracted features from multiple sensor data are fused.

In view of this background it is desirable to improve existing object detection concepts for fused sensor data.

SUMMARY

This demand is met by methods, apparatuses and vehicles in accordance with the independent claims. Advantageous embodiments are addressed by the dependent claims.

According to a first aspect of the present disclosure, it is provided a method of object detection in a scene represented by depth data of a range detection sensor and image data of a camera. In order to overlay the different sensors' perceptions of the scene, the method includes projecting the depth data onto the image data to generate projected depth data. The projected depth data is encoded to multiple channel information to generate encoded projected depth data. Then the and image data and the encoded projected depth data are fed into one or more convolutional neural networks configured to detect or classify objects in the scene based on the image data and the encoded projected depth data.

In some examples, the method comprises feeding the image data and the encoded projected depth data into one or more common convolutional layers of a convolutional neural network to learn image features. The learned image features are then fed into one or more fully connected layers of the convolutional neural network to detect or classify objects in the scene. Such examples relate to LLF approaches where multiple channels of fused hybrid data are fed into a convolutional neural network to learn features and then fed through fully connected layers to detect and classify objects (class score) and predict respective bounding boxes for the objects.

In some examples, the method comprises feeding the image data and the encoded projected depth data into respective separate convolutional neural networks to learn separate features, joining (for example, by concatenating, by summing, by averaging, etc.) the learned separate features, and feeding the joined features into a common convolutional neural network to detect or classify objects in the scene. Such examples relate to MLF approaches where each data type of fused hybrid data is fed into an independent convolutional neural network to learn features and then the learned features are concatenated and fed through fully connected layers via a convolutional neural network to detect and classify objects (class score) and predict respective bounding boxes for the objects.

In some examples, encoding the projected depth data comprises encoding respective depth values into three-channel color information to generate the encoded projected depth data. Such examples relate to so-called JET encoding which is a coloring scheme which converts the distance value J at each pixel i into three channels, for example, each with 8 bit values. This can be achieved by using linear interpolation. In other examples, encoding the projected depth data comprises encoding respective depth values into three channels comprising horizontal disparity, height above ground, and angle to gravity to generate the encoded projected depth data. These examples relate to so-called NBA encoding which converts the distance value J at each pixel i into three channels horizontal disparity, height above ground, and angle to gravity (HHA).

In some examples, projecting the depth data onto the image data comprises generating a transformation matrix comprising a rotation and translation portion for projecting the depth data onto the image data. Such examples refer to the so-called extrinsic calibration between the camera and the range detection sensor, which is the process of determining a homogeneous (extrinsic) transformation matrix T which can project the range detection sensor points onto the image plane. In other words, extrinsic calibration between range detection sensor and camera corresponds to finding the transformation matrix between their respective coordinate systems. The extrinsic calibration can transform 3D points to 3D points in a different coordinate system. In this case it transforms 3D points from the range detection sensor to 3D points in the camera coordinate system. Next to the so-called extrinsic calibration (rotation+translation), some embodiments also make use of intrinsic calibration of the camera. An intrinsic calibration matrix projects 3D points onto the 2D image. That is to say, the projection (3D to 2D) is done by the intrinsic camera matrix.

In some examples, generating the transformation matrix comprises determining the transformation matrix T maximizing the (similarity) function $$S(T) = \sum_{f=1}^{N} \sum_{i} X_i^f(T) \cdot E_i^f$$

wherein N denotes a number of images or frames, i denotes the i-th pixel in a range detection sensor cloud $X_i^f$, and $E_i^f$ denotes the i-th pixel in an edge image E derived from the image data.

In some examples, the range detection sensor is a LiDAR. However, other range detection sensors delivering depth data, such as radar or ultrasound sensors, are also possible.

In some examples, the method can further include providing additional radar data of the scene. The radar data of the scene is projected onto the image data and/or the projected depth data. Such examples relate to the fusion of camera data, LiDAR data, and radar data, and can yield even more accurate results.

In some examples, the method can further include categorizing the radar data into different radar data clusters based on position and velocity information extracted from the radar data, and computing a respective center of mass for each radar data cluster. Such examples make use of the fact that radar typically provides both position and radial velocity measurements directly.

While velocity information can be directly provided by radar through Doppler shift calculation, some examples propose to estimate this property from the depth data (e.g., LiDAR data). Thus, the method can further include extracting different point clusters from the depth data (e.g., LiDAR data), associating each point cluster with a target object, estimating the target object's velocity based on the movement of the point cluster's center of mass between consecutive frames, and comparing the estimated target object's velocity with velocity information of a corresponding radar data cluster.

According to a further aspect, the present disclosure provides an apparatus for object detection in a scene represented by depth data of a range detection sensor and image data of a camera. The apparatus comprises processing circuitry which is configured to generate a projection of the depth data onto the image data. The processing circuitry is also configured to encode the projection of the depth data to three-channel information to generate an encoded projection of the depth data. The apparatus comprises one or more convolutional neural networks configured to detect or classify objects in the scene based on the image data and the encoded projection of the depth data.

In some examples, the apparatus comprises at least one common convolutional layer of a convolutional neural network configured to learn image features based on both the image data and the encoded projection of the depth data, and at least one fully connected layer of the convolutional neural network configured to detect or classify objects in the scene based on the learned image features. Such examples relate to LLF approaches where multiple channels of fused hybrid data are fed into a convolutional neural network to learn features and then fed through fully connected layers to detect and classify object (class score) and predict a bounding box for the object.

In some examples, the apparatus comprises a first convolutional neural network configured to learn first features based on the image data, a separate second convolutional neural network configured to learn second features based on the encoded projection of the depth data, a processor configured to join the learned first and second features, and a common convolutional neural network configured to detect or classify objects in the scene based on the joined features. Such examples relate to MLF approaches where each data type of fused hybrid data is fed into an independent CNN network to learn features and then the learned features are concatenated and fed through fully connected layers via a CNN to detect and classify object (class score) and predict the bounding box for the object.

According to yet a further aspect, the present disclosure provides a vehicle, the vehicle comprising a LiDAR to capture a depth image data of the vehicle's environment, a camera to capture a color image data of the vehicle's environment, processing circuitry configured to generate a projection of the depth image data onto the color image data, and to encode the projection of the depth image data to three-channel information to generate an encoded projection of the depth image data, and one or more convolutional neural networks configured to detect or classify objects in the vehicle's environment based on the color image data and the encoded projection of the depth image data.

The previously described aspects can optionally also be combined with the following aspects.

According to a further aspect of the present disclosure, it is provided a method of object detection in a scene based on lidar data and radar data of the scene. The method includes transforming the lidar data and the radar data to a common coordinate system, extracting different radar point clusters from the radar data, extracting different lidar point clusters from the lidar data and associating each lidar point cluster with a target object, estimating a target object's velocity based on the movement of the respective lidar point cluster between consecutive lidar images, and comparing the estimated target object's velocity with velocity information of a corresponding radar point cluster to identify corresponding radar and lidar point clusters.

In some examples, comparing the estimated target object's velocity with velocity information of a corresponding radar point cluster comprises comparing the velocity of the center of mass of a lidar point cluster with a velocity of the center of mass of a radar point cluster.

In some examples, the method further comprises detecting an object (e.g. another vehicle) if a difference between the velocities of corresponding lidar and radar point clusters is below a predefined threshold.

In some examples, the method further providing a camera data of the scene, projecting the lidar data onto the camera data to generate projected lidar data, encoding the projected lidar data to multi-channel information to generate encoded projected lidar data, and feeding the camera data and the encoded projected lidar data into one or more convolutional neural networks configured to detect or classify objects in the scene based on the camera data and the encoded projected lidar data.

In some examples, the camera data and the encoded projected lidar data are fed into a common convolutional layer of a convolutional neural network to learn image features, and feeding the learned image features into a fully connected layer of the convolutional neural network to detect or classify objects in the scene.

In some examples, the camera data and the encoded projected lidar data are fed into respective separate convolutional neural networks to learn separate features. The learned separate features are joined and then fed into a common convolutional neural network to detect or classify objects in the scene.

According to yet a further aspect, the present disclosure also provides an apparatus for object detection in a scene based on lidar data and radar of the scene. The apparatus comprises processing circuitry configured to transform the lidar data and the radar data to a common coordinate system, to extract different radar point clusters from the radar data, to extract different lidar point clusters from the lidar data and associating each lidar point cluster with a target object, to estimate a target object's velocity based on the movement of the respective lidar point cluster between consecutive lidar images, and to compare the estimated target object's velocity with velocity information of a corresponding radar point cluster to identify corresponding radar and lidar point clusters.

Embodiments of the present disclosure can improve existing calibration approaches and lead to better detection and localization accuracy of objects. This can be helpful for developing and implementing autonomous cars, for example.

BRIEF DESCRIPTION OF THE FIGURES

Some examples of apparatuses and/or methods will be described in the following by way of example only, and with reference to the accompanying figures, in which FIG. 1a, b shows examples of HLF and FFF architectures;

FIG. 5 shows a visualization of an example edge extraction method. (Left) shows the rectified camera image. (Right) shows the edge extracted image using Sobel operator and Gaussian blur;

DETAILED DESCRIPTION

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled or via one or more intervening elements. If two elements A and B are combined using an "or", this is to be understood to disclose all possible combinations, i.e. only A, only B as well as A and B. An alternative wording for the same combinations is "at least one of A and B". The same applies for combinations of more than two Elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

Figure 2:
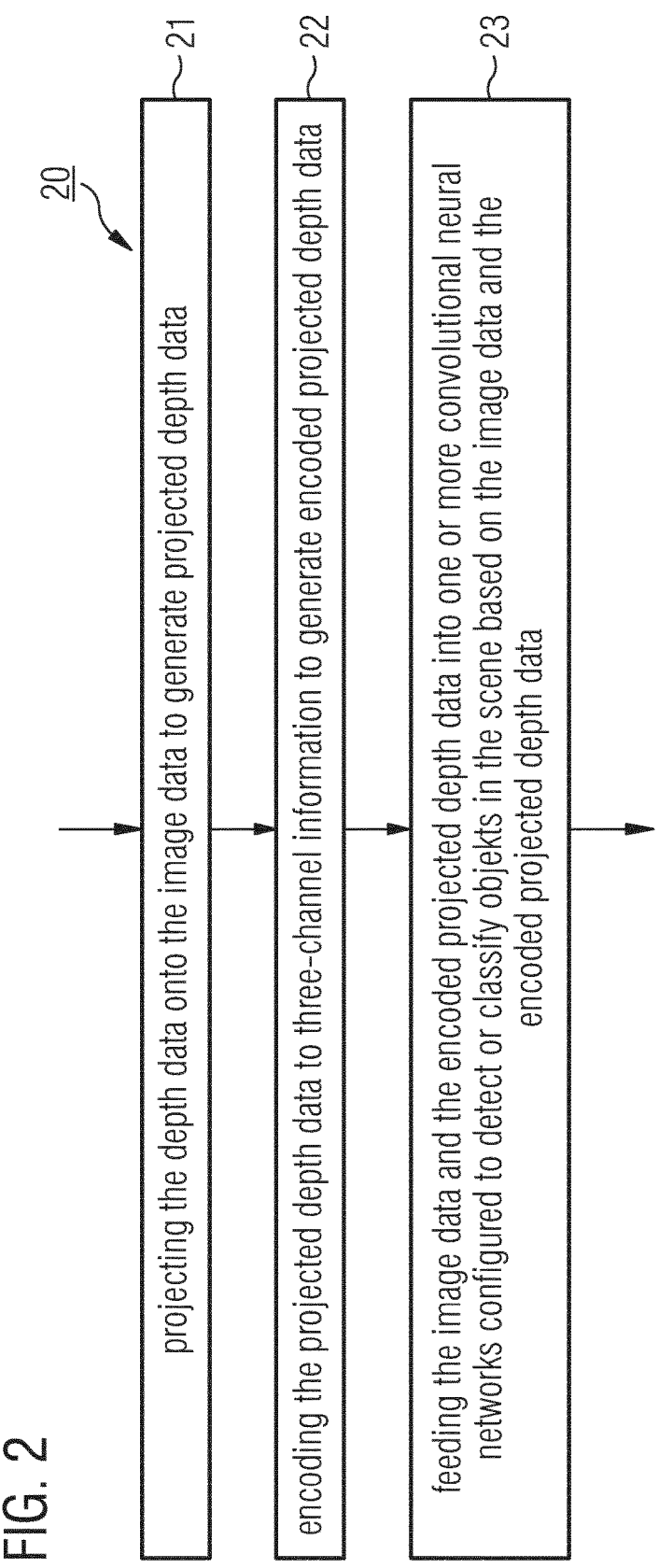
FIG. 2 shows a schematic flowchart of a method of object detection

FIG. 2 shows a schematic flowchart of a method 20 of object detection in a scene represented by depth data of a range detection sensor and image data of a camera.

Method 20 includes projecting or transforming 21 the depth data onto the image data to generate projected depth data. This act can also be referred to as calibration, including extrinsic calibration between the sensors. Method 20 also includes encoding 22 the projected depth data to multi-channel information to generate encoded projected depth data. The encoded projected depth data can then be fused or combined with the image data. Then, in act 23, the image data and the encoded projected depth data (hybrid data) can be fed into one or more convolutional neural networks configured to detect and/or classify objects in the scene based on the image data and the encoded projected depth data.

The different acts of method 20 will be described in more detail in the following. It will be detailed how to achieve improvements in object detection using fused data from vision and range sensors. Examples of such sensors are camera and LiDAR. The skilled person having benefit from the present disclosure will appreciate however that the concepts described herein are not limited to those sensors and can also be applied to other sensor types.

Cameras have the advantage of being cheap and providing rich and dense information with color. But they cannot provide any range or depth information and are susceptible to weather conditions like rain, snow and fog. LiDAR on the other hand, has the advantage of giving range information and is non-susceptible to disturbance in weather but has the disadvantages of being costly, has no color information and requires maintenance as it has moving parts. It is proposed to use the advantages from both these sensors to improve object detection accuracy. It is proposed to use the rich dense color information from the camera and range information from the LiDAR. To use the information from both, the sensors need to be calibrated extrinsically so that both the sensors see the same scene. Once accurate extrinsic calibration between camera and LiDAR is obtained, the LiDAR data can be projected onto the camera image. Then, this fused data can be used to improve the object detection.

Figure 3:
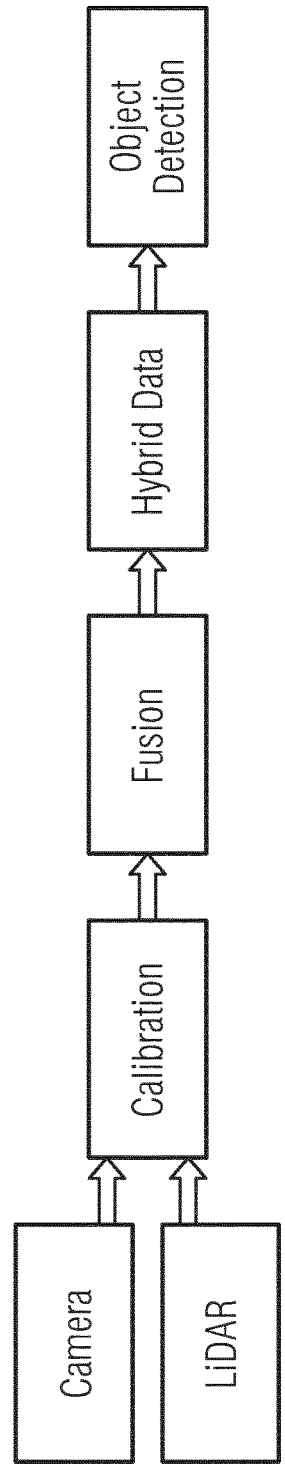
FIG. 3 illustrates an example approach to achieve improvement in object detection using fused data from vision sensors.

As it can be seen from FIG. 3, the main tasks in a proposed example process are
Calibration of camera and LiDAR (including intrinsic and extrinsic calibration),
Data fusion from camera and LiDAR,
Hybrid data generation from fused data, and
Object detection based on the hybrid data.

Example algorithms to implement these tasks will be detailed in the following. Calibration in the context of this disclosure serves two purposes: improve sensor performance by removing any structural errors in the sensor output, and determine geometric relationship between multiple sensors.

Camera calibration or geometric camera calibration refers to the process of estimating the parameters of the lens and the image sensor of a camera. Most cameras are modelled using the pin-hole camera model. Pin-hole camera model is a simple camera model without a lens but with a small aperture. Light rays pass through the aperture and project an inverted image on the camera. An intrinsic calibration matrix $$K = \begin{bmatrix} f_{y1} & s & c_{y1} \\ 0 & f_{y2} & c_{y2} \\ 0 & 0 & 1 \end{bmatrix}$$

can be used to project 3D points $(x_1, x_2, x_3)$ onto the 2D image plane according to $$\begin{pmatrix} y_1 \\ y_2 \\ 1 \end{pmatrix} = K \begin{bmatrix} 1 & 0 & 0 & 0 \\ 0 & 1 & 0 & 0 \\ 0 & 0 & 2 & 0 \end{bmatrix} \begin{pmatrix} x_1 \\ x_2 \\ x_3 \\ 1 \end{pmatrix},$$

where $f_{y1}$ and $f_{y2}$ are focal length in pixels, $c_{y1}$ and $c_{y2}$ are coordinates of the image center in pixels s is the skew factor which accounts for the shape of the pixels. Most cameras have nearly perfect rectangular pixels which makes the skew factor almost equal to 0.

An ideal pin-hole camera does not have a lens, but to accurately represent a real camera a lens can be included in the model. A common problem with the lenses are distortions. Two types distortions usually occur in the image, radial distortion and tangential distortion. For a pixel point at (x, y), radial distortion can be corrected using by $$x_{corrected} = x(1 + k_1 r^2 + k_2 r^4 + k_3 r^6), \text{ and}$$

$$y_{corrected} = y(1 + k_1 r^2 + k_2 r^4 + k_3 r^6).$$

$(x_{corrected}, y_{corrected})$ the corrected point on the output image. $k_1$, $k_2$, $k_3$ are the radial distortion coefficients. Tangential distortion can be corrected by $$x_{corrected} = px + [2p_1 xy + p_2(r^2 + 2x^2)], \text{ and}$$

$$y_{corrected} = y + [p_1(r^2 + 2y^2) + 2p_2 xy].$$

$(x_{corrected}, y_{corrected})$ is the corrected point on the output image r is the Euclidean distance $r^2 = x^2 + y^2$. $p_1$, $p_2$ are the tangential distortion coefficients. Thus, the distortion coefficients of the camera are given by $(k_1, k_2, k_3, p_1, p_2)$.

The process of determining the unknown parameters of the intrinsic calibration matrix K and unknown distortion coefficients $(k_1, k_2, k_3, p_1, p_2)$ is the called (intrinsic) camera calibration. These unknown parameters can be derived using the geometric equations. An example closed-form solution of a calibration algorithm needs to observe a planar pattern at different orientations and is followed by a nonlinear refinement based on the maximum likelihood criterion.

Light Detection and Ranging (LiDAR) sensors have become popular in the autonomous car industry because of their nature of measurement of range with very high accuracy and independent of weather conditions. LiDAR typically uses ultraviolet light to determine the distance to an object. The working principle of LiDAR is that it fires rapid pulses of laser light at a surface and the receiver sensor in the LiDAR measures the amount of time it takes for each pulse to bounce back. Since the speed of the light is constant, the distance to the object can be calculated as follows:

distance=(speed of Light×time of flight)/2 in a LiDAR, laser beams rotate with measured speed and position enabling the LiDARs to know the range measurement of the surroundings. The wavelength of the light source used in LiDAR determines the maximum resolution and types of material surfaces that can be measured. With state of the art LiDAR technology, there are multiple rotating laser beams which can provide denser data than a single beam LiDAR. For example, there are 16 beam, 32 beam, 64 beam and 128 beam LiDARs available with varying field of view and density of the point cloud. As LiDAR is spinning they can provide 360° azimuthal field of view (θ) and an elevation field of view of about 25° (φ). Intrinsic LiDAR calibration is the process of determining the transformation matrix of each laser emitter to the sensor's base coordinate frame. Each laser beam in LiDAR is fixed with respect to a vertical angle and offset to the rotational level. For each point determined by the LiDAR a rotational and a horizontal correction factor should be applied to get the exact location the point in 3D space. The calibration for the LiDAR is usually done and provided by the manufacturers and the process followed by the manufacturers is not completely revealed. However, there are various unsupervised and supervised intrinsic LiDAR calibration approaches available in the art which will not be detailed here for the sake of brevity.

Extrinsic calibration between the camera and LiDAR is the process of determining the homogeneous transformation matrix ($^{camera}T_{lidar}$) which can project the LiDAR points onto the image plane. The homogeneous transformation matrix will comprise of a rotation matrix (R) and a translation matrix (T)

$$^{camera}T_{lidar} = [R_{3\times3} T_{3\times1}].$$

The act 21 of projecting the depth data onto the image data thus comprises generating a transformation matrix $^{camera}T_{lidar}$ comprising a rotation and translation portion for projecting the depth data onto the image data. A LiDAR measurement point $P_{lidar}$ can be projected onto the camera image plane as 2D point $P_{image}$ using the extrinsic transformation matrix and the camera intrinsic matrix by equation developed by pin-hole camera model according to $$P_{image} = K \times {}^{camera}T_{lidar} \times P_{lidar}.$$

$^{camera}T_{lidar}$ is the transformation matrix which transforms the LiDAR coordinate frame to the camera coordinate frame. $P_{image}$ is the point in the camera image plane. K is the camera intrinsic matrix derived by using the pin hole camera model. The extrinsic calibration of camera and LiDAR is to find a valid $^{camera}T_{lidar}$. This is challenging because of the nature of the sensors. The camera gives 2D information and a LiDAR gives 3D information.

Figure 4:
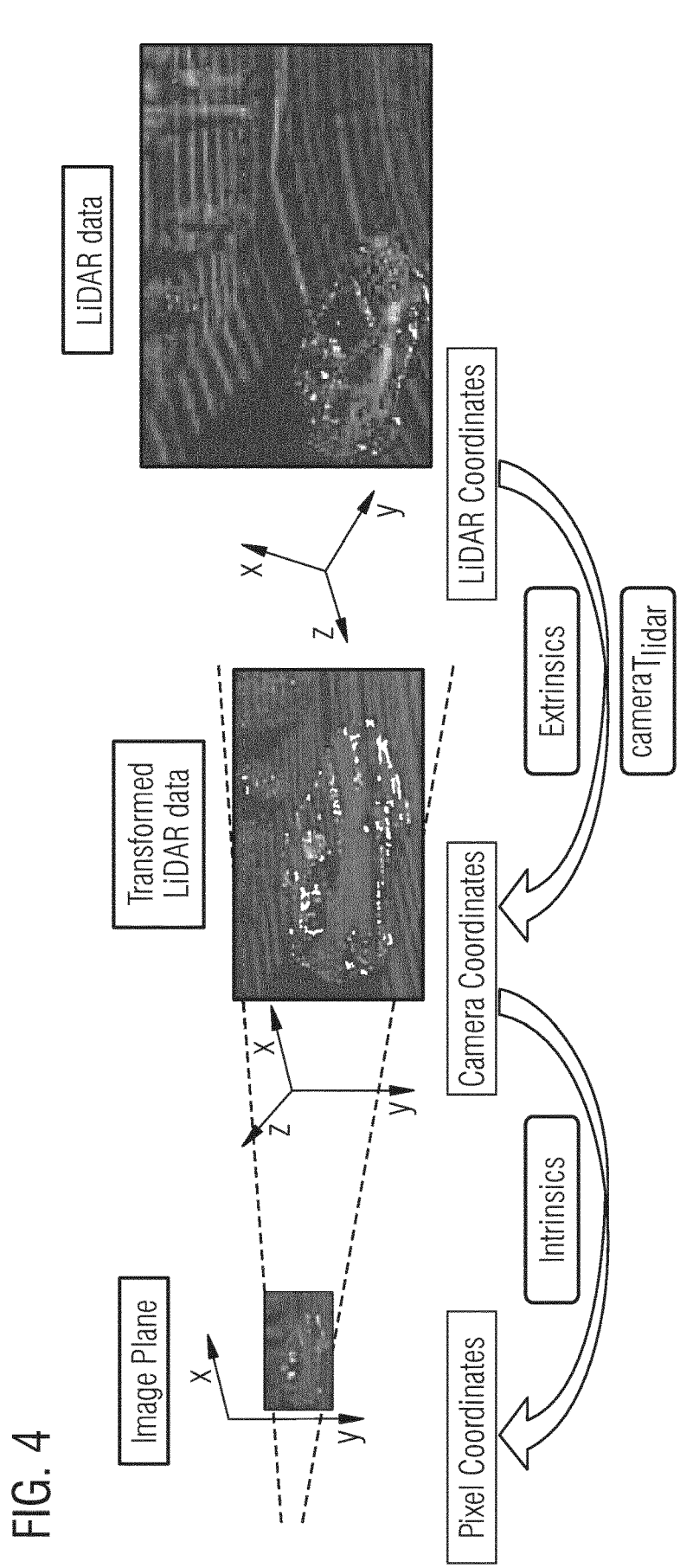
FIG. 4 illustrates the concept of extrinsic calibration between the camera and LiDAR.

The problem statement is to find the calibration parameters which can accurately project the point cloud data (depth data) from the LiDAR to the camera image plane. This will be a homogeneous transformation matrix $^{camera}T_{lidar}$ which can effectively project all the LiDAR points on to the camera image plane. In the example described herein, the task is to find the accurate $^{camera}T_{lidar}$ matrix which has six parameters in total. This is illustrated in FIG. 4, which illustrates the extrinsic calibration between the camera and LiDAR. The goal is to find the extrinsic calibration matrix $^{camera}T_{lidar}$ which transforms the LiDAR point cloud data to the camera coordinate frame. In the example illustrated herein, $^{camera}T_{lidar}$ is a 3×4 transformation matrix which is of six degrees of freedom with three translation parameters along X, Y and Z axis and three rotational parameters with rotation along X, Y and Z axis as shown in FIG. 4.

For finding the extrinsic calibration between the camera and LiDAR it is proposed herein to extract edges from the camera image and the LiDAR point cloud image. The similarity of the edges in these images can then be evaluated for different $^{camera}T_{lidar}$ values (hypothesis). This similarity score can serve as the measure of good extrinsic calibration. The calibration with the maximum similarity score is ideally the best extrinsic calibration $^{camera}T_{lidar}$. Thus, the goal is to find the extrinsic calibration of camera and LiDAR which can align a series of LiDAR intensity discontinuities with the camera image edges. The details of edge extraction in the images, generating intensity discontinuities in point clouds, formulation of the similarity function and the optimizer are detailed in the following sections.

Each camera image can be pre-processed to extract edges. The edge image E can be derived in two steps:
Convert image to grayscale.
Extract edges from grayscale image using the Sobel operator.
Optionally, the edges can be blurred to reward the nearly matching point cloud points with the image edges. While one option is Inverse Distance Transformation (IDT) for this purpose, another possibility would be to use the IDT with erosion and dilation which can increase the robustness to shadows in the scene. Here, it is proposed to use Gaussian blur for this purpose, which can also suppress the noise on the edge image by blurring the edges. An example rectified camera image and the corresponding edge extracted blurred image are shown in FIG. 5. The left image shows the rectified camera image. The right image shows the edge extracted image using Sobel operator and Gaussian blur.

The point cloud from LiDAR can be processed to compute the intensity discontinuities. For this purpose, the point cloud $P_i$ can be processed and transformed into a new point cloud $P_i^{new}$ where each point p in this $P_{i,j}^{new}$ can be assigned a value as follows:

$$P_{i,j}^{new} = \max(P_{i,j-1} - P_{i,j}, P_{i,j+1} - P_{i,j}, 0)$$

Unlike using range discontinuity, it is proposed to rely on intensity discontinuity. $P_{i,j}^{new}$ refers to the intensity of the jth measurement of the beam i. From experiments it can be observed that calibration results obtained using the intensity values are better than calibration using the range measurements. Reasons for better calibration with intensity discontinuity is that most of the planar surfaces with edges do not have any range discontinuities and different materials do not exhibit range discontinuity but intensity discontinuity.

Once we have derived the edge image E and intensity discontinuity $P^{new}$ by processing point clouds, we can project all the points in the point cloud $P^{new}$ onto the image plane using $P_{image} = K \times {}^{camera}T_{lidar} \times P_{lidar}$.

We propose to define a similarity function S which serves as a measure for effective extrinsic calibration as shown below:

$$S(T) = \sum_{f=1}^{N} \sum_{i=1}^{|X^f|} X_i^f(T) \cdot E_i^f,$$

where for a given extrinsic transformation T all the points in point cloud $X_i$; are projected onto the image E using $P_{image} = K \times {}^{camera}T_{lidar} \times P_{lidar}$.

The similarity function performs element wise multiplication of a projected point cloud X for a given extrinsic transformation T with edge image E and returns the sum of this over all points i in point cloud X Where f iterates over N frames. In simple terms, the similarity function sums up the intensity discontinuities of each laser scan in X times the edginess of image E for some extrinsic calibration matrix T. The objective is to find an extrinsic transformation matrix $^{camera}T_{lidar}$ which effectively aligns the edges in the image with the point cloud intensity discontinuities, in simple words, which maximizes the similarity function S. Thus, generating or determining the transformation matrix $^{camera}T_{lidar}$ comprises determining the transformation matrix maximizing the similarity function S. As extrinsic transformation T has six degrees of freedom, ideally S would be maximized by searching the entire six-dimensional search space for all possible transformations of T. This six-dimensional search currently cannot be realized effectively in real time. The search space of the similarity function is highly non-convex with many local maxima.

Finding an accurate $^{camera}T_{lidar}$ which maximizes S is an optimization problem. An optimum online search of this function may not be feasible and there is no analytically solution for this similarity function. An exhaustive grid search over the entire 6-dimensional search space can be used to find the optimum calibration. However, this is exhaustive and computationally very expensive. Also selecting an efficient grid size is always challenging. It is also possible to use particle swarm optimization to find the accurate calibration. This approach can fall into local optimum in high-dimensional space like the one we have and also has a low convergence rate in the iterative process. Here, it is proposed to use Bound Optimization BY Quadratic.

Approximation (BOBYQA), a numerical optimization algorithm for maximizing S. BOBYQA solves a constrained optimization problem without using the derivatives of the objective function. It uses the trust region method that forms quadratic models by interpolation. In short, it is an algorithm for finding the minimum or maximum of a black box function $F(x)$, $x \in \mathbb{R}^m$ with subject to bounds of the optimization variable $a \leq x \leq b$. F being a function that returns a value $F(X)$ for any feasible x. BOBYQA employs quadratic approximation Q to function F such that it satisfies $Q(y_i)=F(y_i)$, i=1, 3, ..., m. these interpolation points are chosen automatically. This quadratic model is used to solve the trust region sub problem with a lower bound on the trust region radius by updating the model using the technique of minimizing the Frobenius norm of the change to second derivative of the quadratic model.

An offline calibration process can be performed to derive the $^{camera}T_{lidar}$ since we currently cannot determine the global optimum of S in real-time, but it is possible to track the extrinsic calibration with significant accuracy. It is possible to determine whether a given extrinsic calibration C or the extrinsic transformation $^{camera}T_{lidar}$ is correct or not within a threshold. The idea here is that whether or not $S_c$ is a local optimum of S for a given calibration C is the key to determine if the calibration is correct or not. A grid search with radius 1 can be performed, centered around a given calibration C across all six dimensions which generates $3^6$ (729) different values of 5, one of this will be $S_c$ itself which is the center of the grid. Let $F_c$ be the fraction of the 728 generated values of S that are worse than $S_c$. The idea is that when the extrinsic calibration C is correct, most of these 728 S values should lower the similarity score, i.e. making the $F_c$ near to 1. If the given extrinsic calibration C is incorrect, a large number of these 728 S values will increase the similarity score, i.e. making the $F_c$ near to 0.

The next section talks about the fusion of raw data from camera and LiDAR sensors.

For fusing or joining the data from camera and LiDAR, accurate extrinsic calibration between these sensors is important. Inaccurate extrinsic calibration between sensors can create ghost objects and other undesired consequences in the fused data. The previous sections outlined how the required accurate extrinsic calibration between camera and LiDAR can be achieved. Once the extrinsic transformation matrix $^{camera}T_{lidar}$ and the camera intrinsic matrix K have been determined, the LiDAR point cloud can be projected onto the image plane using $$P_{image}=K \times {}^{camera}T_{lidar} \times P_{lidar}.$$

In one example, the fusion pipeline can be implemented in Robot Operating System (ROS) as middle-ware. ROS subscribers of camera and LiDAR raw data topics are responsible for asynchronously filling the corresponding message buffers when there is a new incoming data from the sensors. For example, LIDAR can generate data at 10 Hz whereas the camera generates data at around 30 Hz. The fusion process can run in a 10 ms loop and since the data rate of camera is faster we can store the images from camera into an image buffer. For every point cloud data input, the nearest image to this point cloud data input can be found in the image buffer. ROS time stamp can be used as reference to determine the nearest image. Once the nearest image is found, image buffer can be cleared till the index of the nearest image. The point cloud can be transformed with the $^{camera}T_{lidar}$ and subsequently with the camera intrinsic matrix K to the image plane of the nearest image yielding a fused RGBD image, where RGB is the image information and D is depth information for each pixel.

It is proposed to use the fused RGBD information from the camera and LiDAR sensors (D being the depth information for each pixel in the camera image) for object detection. One approach for object detection is to use machine learning techniques with neural networks where labelled data can be used for training and evaluating the neural network. Labelled data in the context of object recognition is manually labelling the bounding boxes for each object of interest in an image and assigning a class label for each object of interest. Data labelling manually is very expensive and time consuming process as each image needs to be augmented with bounding box and class label information. Problems like object detection usually needs massive labelled data-sets for training. Since getting the labelled data is expensive the common approach is to use pre-trained networks of a similar problem.

There are many popular benchmark data-sets and pre-trained networks like ImageNet available for the image data. But for depth data from LiDAR, there are no available pre-trained networks nor there is any available massive benchmark dataset with labelled data for depth information which can be used for training. One proposed approach is to encode the depth information in a way to resemble the structure of image data with three channels (RGB). So that we can use the available pre-trained networks and training approaches which are designed for the three channel image data. For this purpose, one approach is to use the JET coloring scheme. Three channel depth encoding is obtained by applying JET coloring scheme to the normalized depth values. That is, the act 22 of encoding the projected depth data can comprise encoding respective depth values into three-channel color information to generate encoded projected depth data. Another approach is to use the HHA encoding (Horizontal disparity, Height above ground, Angle to gravity). Three channel depth encoding is obtained from extracting the HHA features from the depth image. In this example, encoding 22 the projected depth data thus comprises encoding respective depth values into three channels comprising horizontal disparity, height above ground, and angle to gravity to generate the encoded projected depth data. Once we encode the depth information into three channels similar to the RGB, we have six-channel hybrid data. Depending on the type of depth encoding used, we either have RGB-JET or RGB-HHA data.

The projected sparse point cloud can be up-sampled and then the depth encoding can be applied to generate the hybrid data. Bilateral filtering can be used to up-sample the sparse depth information from LiDAR. Since our depth map I is already calibrated with respect to camera and projected onto the image plane, the projected depth map I can be up-sampled as follows:

$$D_p = 1/W_p \sum_{q \in \mathbb{N}} G_{\sigma_s}(\|p - q\|) G_{\sigma_r}(|I_q|) I_q$$

N is the neighborhood mask and lower-index $p$ denotes the intensity value at pixel position $p$ in depth map. $D_p$ is the up-sampled depth map of the sparse input depth map I. $G_{as}$ and $G_{ar}$ are weights that penalizes the points with respect to a function distance. $W_p$ is a normalizing factor for the weights.

$$W_p = \sum_{q \in \mathbb{N}} G_{\sigma_s}(\|p - q\|) G_{\sigma_r}(|I_q|) I_q$$

The up-sampled depth map can then be encoded into three channels using JET or HHA encoding.

JET encoding is a coloring scheme which converts the distance value from the up-sampled depth map to three channels each with 8 bit values. This can be achieved using linear interpolation. Distance values in the depth map can be normalized first using the maximum distance in the depth map. The normalized depth value $d_i$ of pixel i can be converted into 3-channel RGB as $r_i$, $g_i$, $b_i$ as follows:

$$d_i = d_i / \max$$
$$r_i = J(d_i - 0.25)$$
$$g_i = J(d_i)$$
$$b_i = J(d_i + 0.25)$$

$$J(x) = \begin{cases} 0 & \text{if } x \leq 0.125 \\ \text{interpolate}(x, 0.0, 0.125, 1.0, 0.375), & \text{if } 0.125 > x > 0.375 \\ \text{interpolate}(x, 1.0, 0.625, 0.0, 0.875), & \text{if } 0.625 > x > 0.875 \\ 1, & \text{otherwise} \end{cases}$$

Here, interpolate(val, $y_0$, $x_0$, $y_1$, $x_1$) is a simple linear function which interpolates the value val between the points ($x_0$, $y_0$) and ($x_1$, $y_1$) as follows $$\text{interpolate}(val, y_0, x_0, y_1, x_1) = \left((val - x_0) \times \frac{y_1 - y_0}{x_1 - x_0}\right) + y_0$$

The HHA features can be extracted from the up-sampled depth map. HHA encoding converts the distance value a at each pixel i into 3 channels horizontal disparity, height above ground, and angle to gravity (HHA) as $h_1$, $h_2$, and a. HHA encodes the properties like geocentric pose which will be harder for the neural networks to learn from the limited depth data. The algorithms of generating HHA are known. The original point cloud may not be in a geocentric frame. We can estimate the surface normal field, and start with the current gravity direction estimate which is the Y axis and estimate all the horizontal and vertical surfaces. Then we re-estimate the gravity direction based on the estimate of the horizontal and vertical surfaces, which updates the gravity estimate. This is repeated for five iterations which will improve the gravity direction estimate. The algorithm tries to find the direction which is mostly aligned to locally estimated surface normal directions at as many points as possible. The algorithm starts with an estimate of the gravity vector and iterative refinement of it using the estimate via the following two steps.

Estimate the horizontal and vertical surfaces as follows:

$$\mathbb{N}_{horz} = \{n : \theta(n, g_{i-1}) < d \text{ or } \theta(n, g_{i-1}) > 180° - d\}$$

$$\mathbb{N}_{ver} = \{n : 90° - d < \theta(n, g_{i-1}) < 90° + d\}$$

$g_{i-1}$ is the current gravity estimate, d is the threshold made by the local surface normal with $g_{i-1}$ and θ (a, b) gives the angle between a and b.

Estimate the new gravity direction gi which is aligned to the normals in $N_{horz}$ and orthogonal to the normals in $N_{ver}$. This nothing but finding the eigenvector with the smallest eigen value of $(N_{ver}N_{ver}{}^t - N_{horz}N_{horz}{}^t)$ as follows:

$$\min_{g: \|g\|_2 = 1} \sum_{n \in N_{ver}} \cos\theta(n, g)^2 + \sum_{n \in N_{horz}} \sin\theta(n, g)^2$$

The following section explains examples of object detection using machine learning techniques and details different example network architectures which can be used for object detection.

Figure 6:
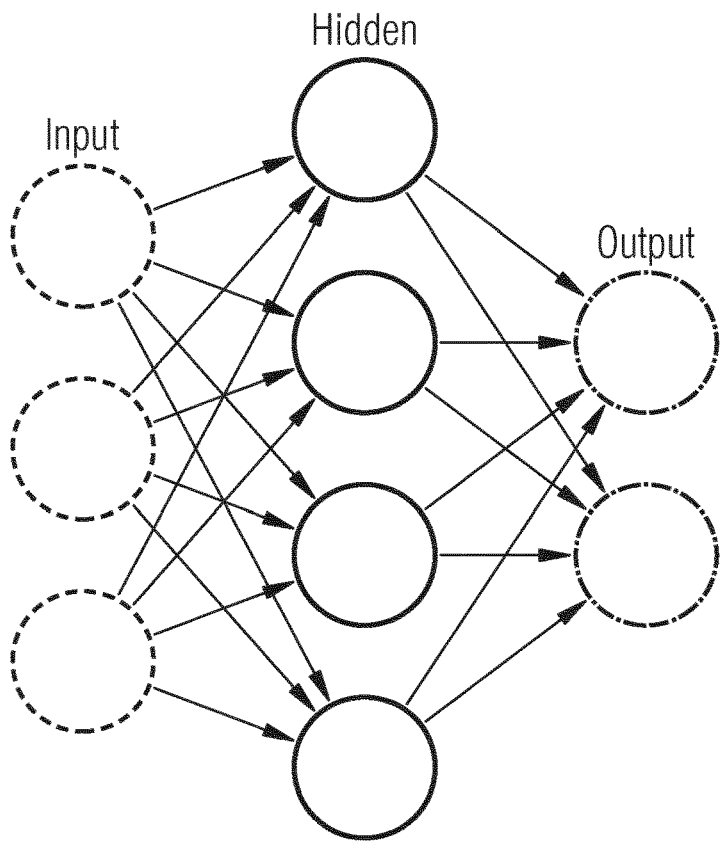
FIG. 6 shows the structure of a typical artificial neural network.

One popular technique for object detection is using neural networks. Neural networks have the capability to process high dimensional data like stream of images. The basic building block of neural networks is called neuron which receive inputs, performs a dot product with a weight of the neuron and pass it on. Neural networks receive inputs and transform it through a series of layers. Each layer is made up of many neurons and each neuron is connected to all the neurons in the previous slayer. The last fully connected layer is called the output layer. Hidden layer is where the neurons are connected to inputs of all the neurons in the next layer and is therefore not visible as a network output (hence the term hidden layer). The structure of a regular neural network is shown in FIG. 6.

Figure 7:
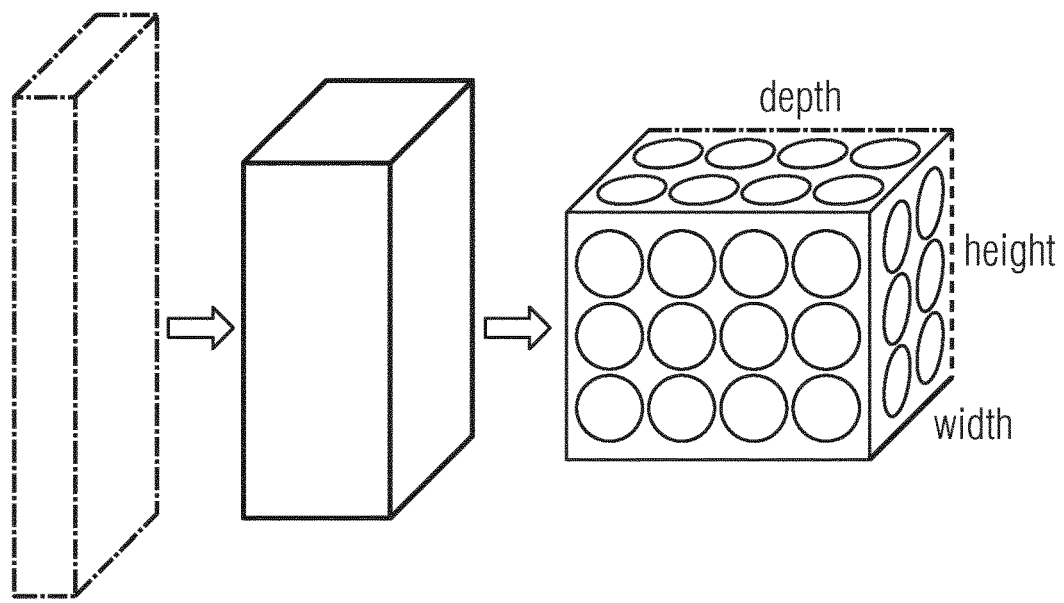
FIG. 7 shows the structure of a convolutional neural network.
Figure 8:
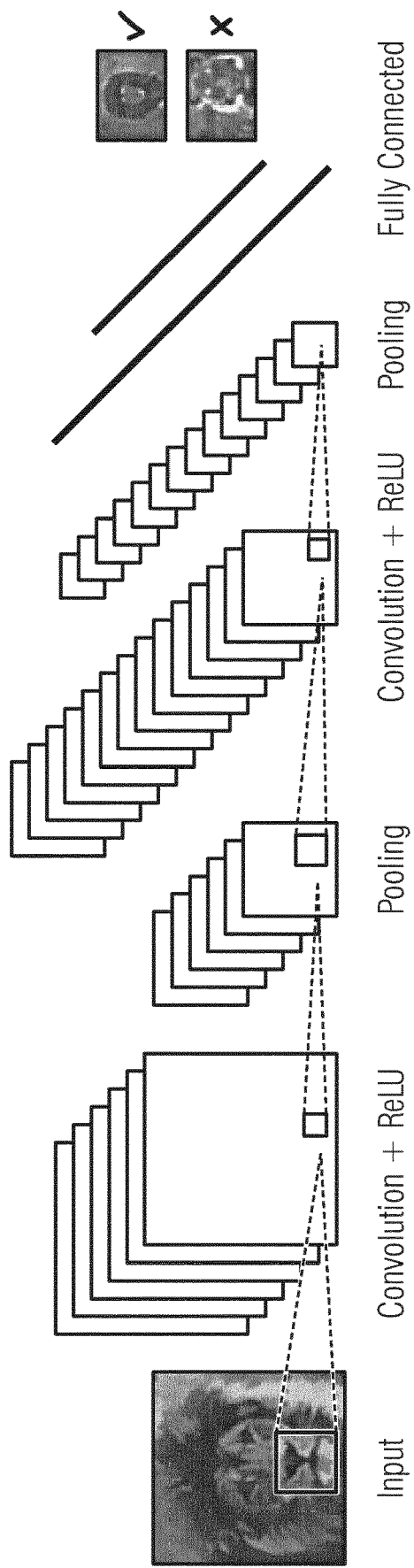
FIG. 8 illustrates the architecture of a typical CNN, an input image containing a "lion" is fed through the CNN and is classified correctly.

A special class of neural networks called Convolutional Neural Networks (CNN) are targeted for image processing tasks like object recognition and classification. Unlike in regular neural networks, basic assumption in CNN is that the input is an image and the neurons are arranged in three dimensions along width, height and depth. FIG. 7 shows a CNN block. The CNN has a sequence of layers and each layer transforms the activation's to another through a differential function. The main layers in a CNN are convolutional layer, pooling layer and fully-connected layer. A typical CNN structure will be a stack of these layers which is shown in the FIG. 8. The basic idea of CNN is to transform the original image layer by layer from the original pixel values to the final image class.

The convolutional layer (cony layer) is the core building block of the CNN. Cony layer consists of many filters and each filter is small spatially along width and height, but extends throughout the full depth of the input volume. So an example filter size of 5×5×3 is a filter with size 5 pixel width, 5 pixel height and spans a depth of 3. Usually the first layer has a depth of three because image typically has three channels R, G, B. Each filter slides across the width and height of the input volume and computes the dot product between the filter and the input pixel value at any position. This process of sliding is called convolution, hence the layer is termed as convolutional layer. As we convolve the filter over the width and height of the input volume we generate 2D activation map that gives the responses of the filter at every spatial position. In other words, the network learns filters that activate when they see some visual features like an edge or color discontinuity etc. After the convolution we have entire filters for each cony layer and these produce a separate 2D activation map. These activation maps are stacked along the depth dimension to produce the output volume, which is given as an input to the next layer.

Figure 9:
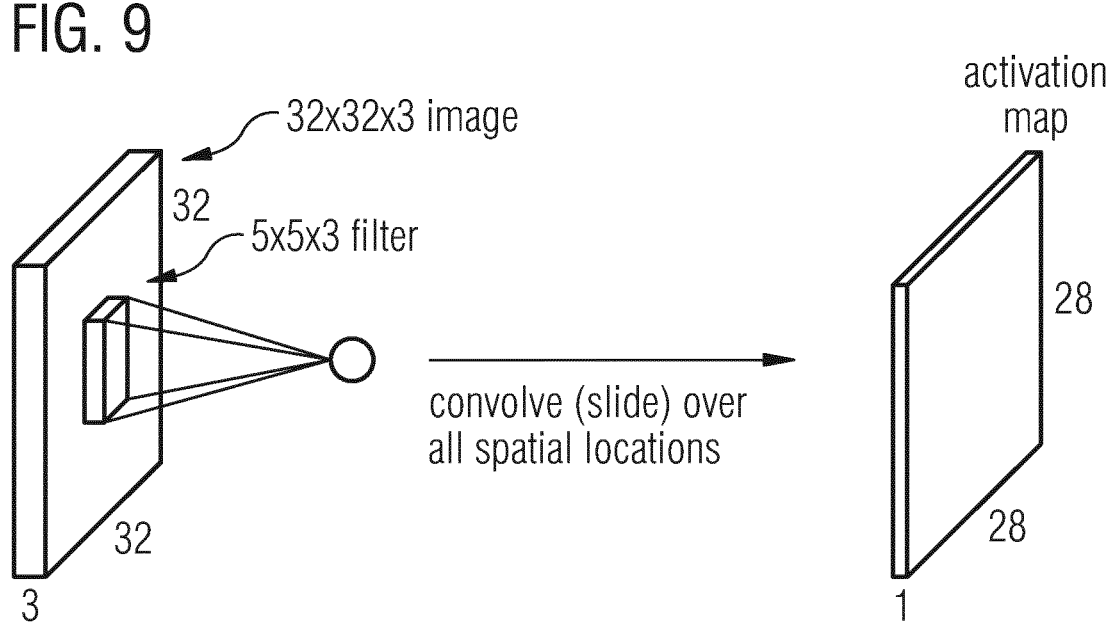
FIG. 9 illustrates the working of a convolutional layer.

FIG. 9 shows the working of a convolutional layer. Hyper parameters like depth, stride and zero-padding control the size of the output volume. Depth of the output volume corresponds to number of filters we would like to use. Stride is the unit with which we slide the filter, if stride is 2, we slide the filter by 2 pixels each time. Large stride values produce smaller output volumes. Sometimes input volumes are padded with zeros around the border to preserve the spatial size of the input volume so that the input and output have same width and height. For a input volume of size $W_i \times H_i \times D_i$ the output volume size $W_o \times H_o \times D_o$ can be calculated as follows:

$$W_o = (W_i - F)/S + 1$$
$$H_o = (H_i - F)/S + 1$$
$$D_o = D_i$$

K is the number of filters, F is the filter size, S is the stride and P is the amount of padding. An optional pooling layer can be inserted in-between cony layers. The function of this layer is to progressively reduce the spatial size of the representation, so as to reduce the amount of parameters. This also helps to control the over fitting. Pool layer slice the input layer from the depth and re-sizes it spatially using the max operator. For a input volume of size $W_i \times H_i \times D_i$ the output volume size $W_o \times H_o D_o$ is calculated as follows:

$$W_o = (W_i - F)/S + 1$$
$$H_o = (H_i - F)/S + 1$$
$$D_o = D_i$$

F is the filter size S is the stride. There are many approaches were pooling layers are not used but the size of the network is reduced by using larger strides in cony layers.

Figure 10:
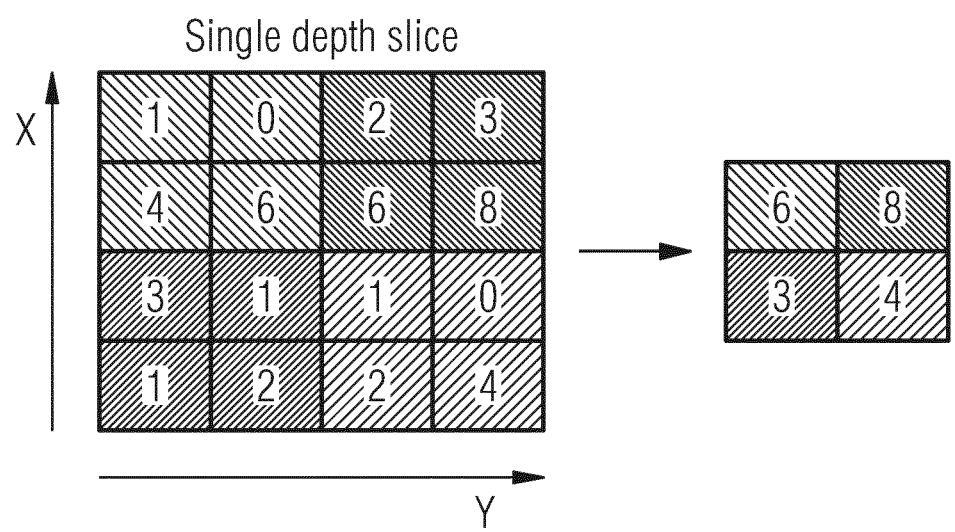
FIG. 10 illustrates the working of a pooling layer.

An example of a pooling layer is shown in FIG. 10, illustrating the common max pooling on a depth slice with a 2×2 filter and a stride 2.

A fully connected layer, as its name suggests, has full connections to all activation's in the previous layer, can be seen in FIG. 6. The typical architecture of CNN's are stacks of few cony layers followed by pool layers and this pattern is repeated and transitioned to fully connected layers. The last connected layer is the output layer with the class scores. There are many popular CNN architectures like LeNET, AlexNet, ZFNet, GoogleNet, VGGNet, ResNet, and CapsuleNet. VGGNet is with cony layer with filters of 3×3 with stride 1 and padding 1. With pool layers of 2×2 max pooling and with a stride of 2.

Another well-known object detection system is Region-based Convolutional Neural Networks (R-CNN) which combines the concept of region proposals with rich features computed by a convolutional network. R-CNN generates region proposals which are basically the bounding boxes using selective search, which is searching the image and trying to group together adjacent pixels based on color, intensity, etc. Once the region proposals are generated these are wrapped to regions and passed to standard CNN architecture like AlexNet and the final layer of the AlexNet has Support Vector Machine (SVM) to classify the object. A linear regression on the region proposal is run to generate more robust bounding boxes as the final step. R-CNN is relatively slow as it has multiple steps in the prediction process—The steps are as below:

Generate region proposals
Compute features for proposals by training a CNN
Classify the regions
Linear regression to tighten the bounding boxes The R-CNN can be improved to Fast R-CNN to account for these multiple steps, where the key change is to use the Region of Interest (RoI) pooling. The basic idea of RoI pooling, CNN is run once per image as opposed to running CNN for every region proposal of an image as in R-CNN. So the forward pass of an image is created and the convolutional features for a particular region proposal are extracted from this resulting forward pass. Second change is to have a joint training frame work to jointly train the CNN classifier and the bounding box regressor as a single model.

Fast R-CNN still has the additional step of generating region proposal through selective search, which generates the regions of interest as an initial step. This additional step of generating region proposal makes the process slow. Faster R-CNN is the architecture build on top the Fast R-CNN which makes this step of region proposal almost cost free. The idea of Faster R-CNN is that the region proposals are dependent on features of the image which are computed by forward pass of the CNN instead of a separate selective search. A single CNN is used to generate the region proposals and also the object classification. This is achieved by Region Proposal Networks (RPN) which slides a window over the image features generated by CNN. At each sliding window location, the network predict multiple region proposals which outputs a score and a bounding box per anchor. RPN is a convolution layer whose output layer is connected to a classification layer which classifies the object and to a regression layer which predict the coordinates of the hounding box. At each sliding window location, K regions are proposed, classification layer having 2 k outputs (objects or not objects) and regression layer having 4 k outputs (coordinates of the bounding box). The RPN is also translational invariant. An anchor with Intersection over Union (IoU) greater than 0.7 with any ground truth bounding box can be given an object label or positive label. All other anchors are given not an object label or negative label and anchors with IoU less than 0.3 with ground truth bounding box are given a negative label.

The RPN can be trained using a multi-loss function as follows:

$$L(\{p_i\}, \{t_i\}) = \frac{1}{N_{cls}}\sum_i L_{cls}(p_i, P_i^*) + \lambda \frac{1}{N_{reg}}\sum_i p_i^* L_{reg}(t_i, t_i^*)$$

Where i is the index of the anchor, $p_i$ is the predicted probability of the anchor i, $p_i^*$ is 1 if the anchor is positive and 0 if its negative. This means labels that are not positive don't contribute to the training $t_i$ is the vector of the predicted bounding box coordinates. $t_i^*$ is the vector of the ground truth bounding box coordinates of positive anchor. $L_{cls}$ is classification loss, which is a log loss over two classes (object vs not object). $L_{reg}$ is the regression loss which is $L_{reg}=R(T_i-T_i^*)$ where R is the robust loss $p_i^*=1$ for positive anchors and 0 for others. The outputs of the classification layer is $\{p_i\}$ and the out of the regression layer is $\{t_i\}$. For bounding box regression the four coordinates can be parametrized as follows:

$$t_x = (x - x_a)/w_a, t_y = (y - y_a)/h_a$$
$$t_w = \log(w/w_a), t_h = \log(h/h_a)$$
$$t_x^* = (x^* - x_a)/w_a, t_y^* = (y^* - y_a)/h_a$$
$$t_w^* = \log(w^*/w_a), t_h^* = \log(h^*/h_a)$$

x, y, w, h are the coordinates of the predicted bounding box with width and height. $x_a, y_a, w_a, h_a$ are the coordinates of the anchor bounding box with width and height x*, y*, w*, h* are the coordinates of the ground truth bounding box with width and height.

These predicted bounding boxes can be passed from the RPN to the Fast R-CNN which classifies the objects and generates a tightened bounding box. So basically the Faster R-CNN has an RPN to generate object proposals which will be passed to Fast R-CNN with some base CNN architecture to classify the object and generate tighter bounding boxes. In essence Faster R-CNN=RPN+Fast R-CNN. As we need to train RPN and Fast R-CNN, Faster R-CNN can use a 4 step alternating training approach; the 4 steps are as follows:

RPN is trained, where network is initialized with an ImageNet pre-trained model weights and fine tuned end-to-end for region proposals.

Fast R-CNN initialized with ImageNet pre-trained model weights is trained using the proposals from previously trained RPN.

Detection layers are shared to RPN and only RPN specific layers are trained.

Only the Fast R-CNN layers are trained keeping the shared cony layers fixed.

This approach makes both networks to share the cony layers and makes this an unified approach for training RPN and Fast R-CNN. The pipeline is take the image, compute the region proposals and then compute CNN based features. These CNNs can be trained on large data-sets like ImageNet with a million images and thousands of labels. Then fine tune the CNN for our particular task. Just feeding a depth image into CNN is not good and we can improve the performance by encoding the depth information using the encoding like JET or geocentric embedding as HHA and convert into a structure like RGB.

Figure 11:
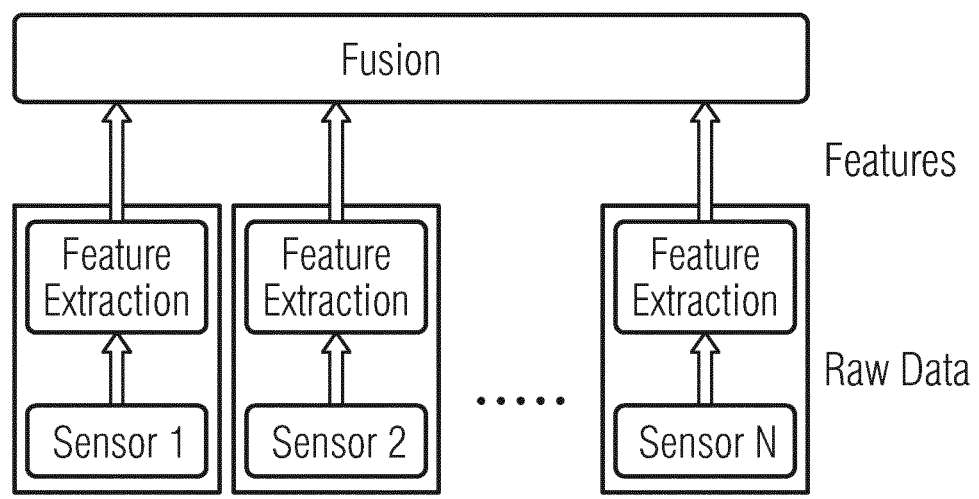
FIG. 11 shows the MLF architecture, the features are extracted on each sensor using conventional feature extractors like CNN, then the extracted futures are fused in the fusion module.

It is proposed to use a Faster R-CNN network for object detection on fused hybrid data. Fusion of multiple sensor data can be achieved in multiple ways as discussed previously. HLF is most popular with car Original Equipment Manufacturers (OEM) as it uses the vendor supplied object lists from the sensors and fuses them into an environment model or perform object detection on the fused data. But as the sensors are not calibrated against each other this approach causes aberrations and ghost objects in the fused environment model. One way to prevent this is to fuse the raw sensor data as in LLF. But achieving LLF also require very accurate extrinsic calibration between the sensors. Another proposal we use in this disclosure is termed as Mid-Level Fusion (MLF), where features extracted from multiple sensors are fused. MLF uses extracted features from sensors rather than object lists as in HLF or raw data as in LLF. FIG. 11 shows the architecture of MLF. The features are extracted on each sensor using conventional feature extractors like CNN, then the extracted futures are fused in the fusion module. To achieve object detection using LLF approach, all the depth encoded channels and the RGB channels can be fed into the same neural network, whereas for object detection using MLF approach each data type (depth and RGB) is fed into separate networks to compute features and then are fused in the last stage. Using separate networks for feature extraction in MLF has the advantage of selecting network for feature extraction based on the data type.

Figure 12:
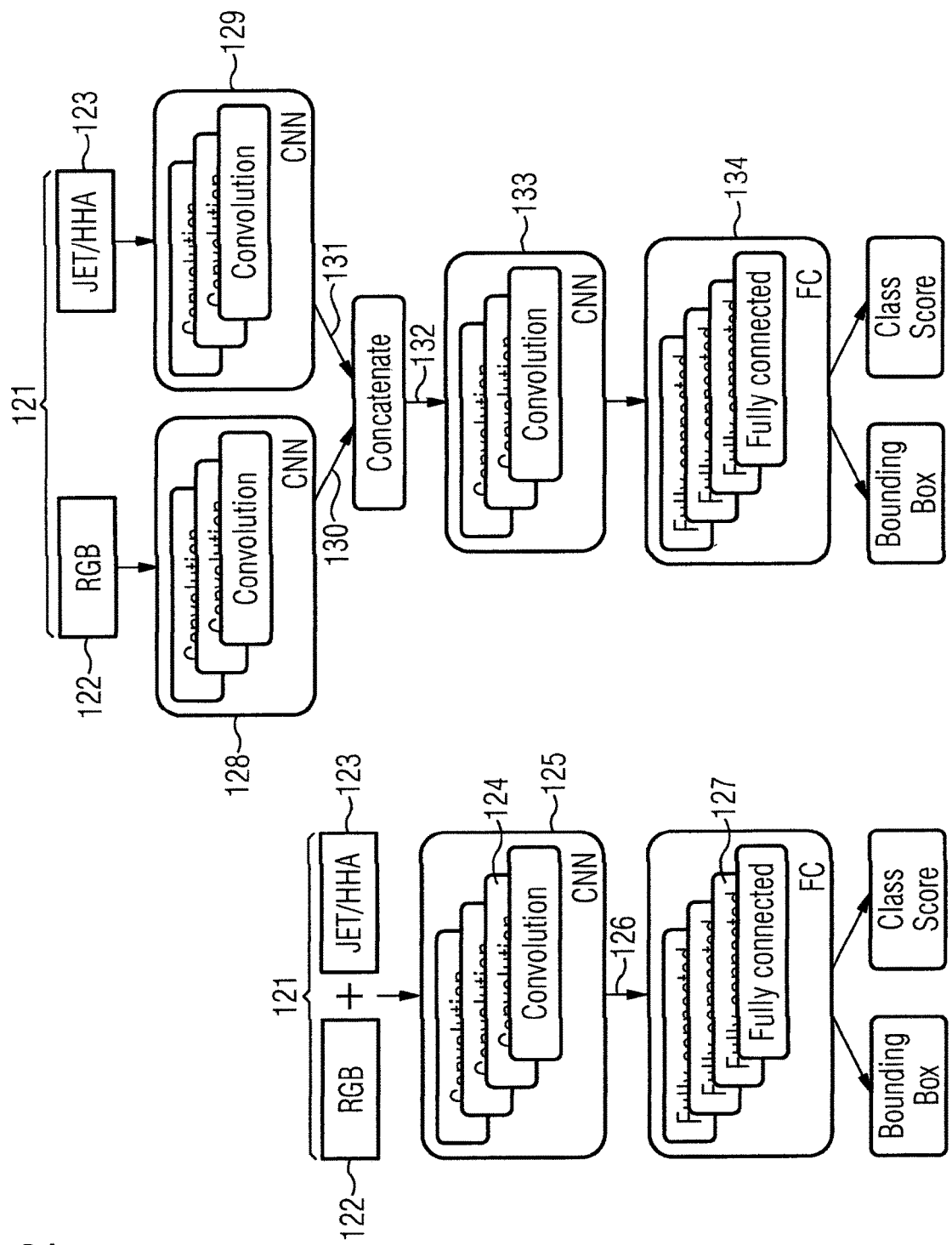
FIG. 12a,b show the detection using an example LLF approach and an example MLF approach.

Faster R-CNN can be used for object detection in embodiments of the present disclosure. But our example input data is hybrid data consisting of six channels either RGB-HHA or RGB-JET resulting from the fusion of camera and LiDAR data as discussed earlier. For LLF, it is propose to modify the input layers of Faster R-CNN to take in six-channel hybrid data, as shown in FIG. 12a. Here, the hybrid data 121 comprising the image data 122 and the encoded depth data 123 is fed into one or more common convolutional layers 124 of a common convolutional neural network (CNN) 125 to learn image features 126. Then the learned image features 126 are fed into one or more fully connected layers 127 of the convolutional neural network to detect or classify objects in the scene. The Faster R-CNN can use a VGG16 architecture for CNN and can be initialized with ImageNet pre-trained weights, for example. To account for the six-channel input, the filter weights for the first three channels (RGB) can be copied to the remaining three channels of depth encoded data (JET/HHA).

Since MFF shown in FIG. 12b has independent networks to extract features from the different data types i.e. RGB and depth encoded data and combine these features at a later stage. Here, the image data 122 and the encoded depth data 123 are fed into respective separate convolutional neural networks 128, 1.29 to learn separate features 130, 131. The learned separate features 130, 131 are concatenated to generate concatenated features 132. The concatenated features 132 are then fed into a common convolutional neural network 133 one or more fully connected layers 134 to detect or classify objects in the scene. For the illustrative purpose of this disclosure we use Faster R-CNN with VGG16 architecture for CNNs. We use two branches one for RGB and one for depth encoded data both with the same architecture containing the first four convolutional layer blocks from VGG16 of Faster R-CNN. Merging these learned convolutional features at the fifth fully connected layer. This modified Faster R-CNN for MIT is also initialized by imageNet pre-trained weights. The depth branch and RGB branch are initialized with the same weights. Since we merge both the convolutional networks of camera and LiDAR at fifth fully connected layer. The weights at this layer can be divided by 2 to account for the double inputs resulting from merging of the cony layers from RGB and depth.

Figure 13:
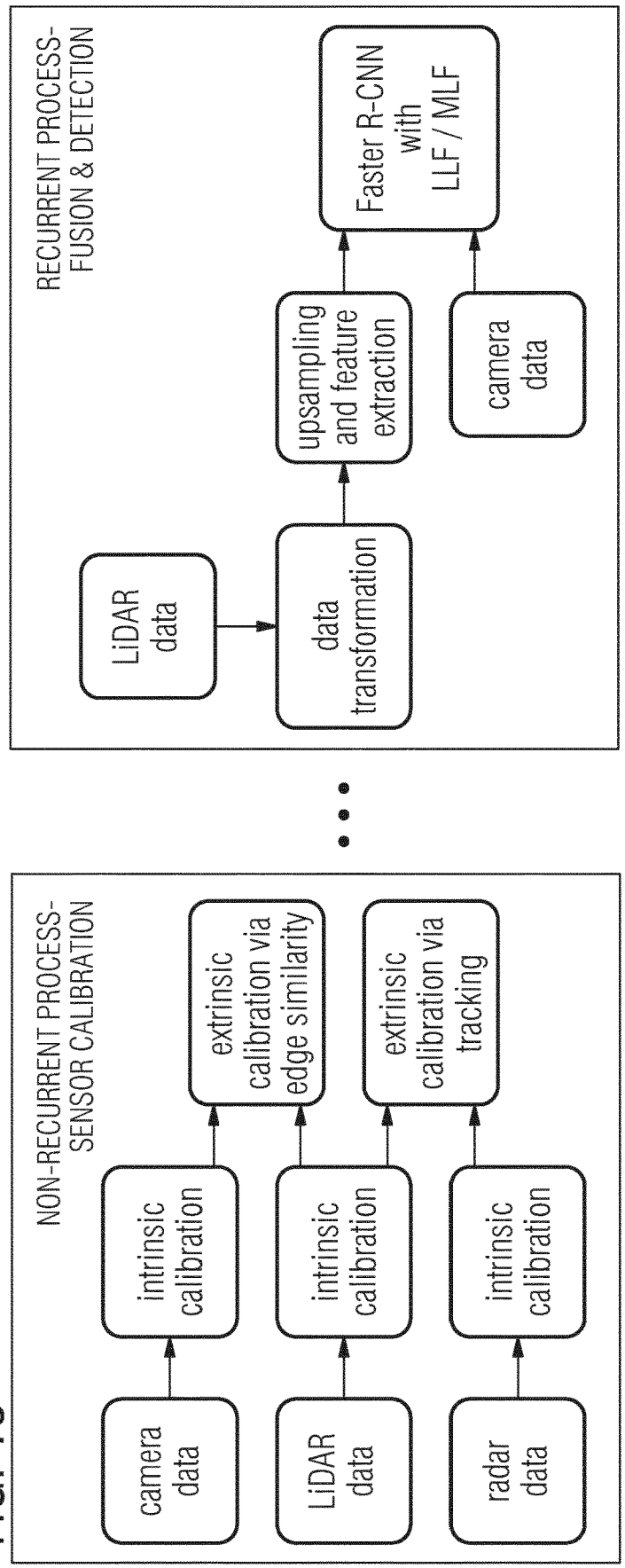
FIG. 13 shows an overview of an example sensor fusion and object detection pipeline, the left diagram visualizes the extrinsic calibration between the sensors and is only executed once or when a new calibration is desired, the right diagram shows the pipeline of the periodically running sensor fusion and object detection/localization.

In addition to LiDARs and cameras, radars can optionally be used in existing sensor fusion architectures. Extensive research has been conducted on the topics of target-based camera-radar calibration, and also LiDAR-radar calibration, where mostly reference targets such as metal panels and corner reflectors are used. Target-based calibration techniques take advantage of the specially designed target objects to maximize the radar perception of the targets, which are practically unable to capture information about target size or structure. However, for consistency with the proposed camera LiDAR calibration algorithms, the present disclosure also proposes a target-less radar calibration method which can be combined with previously described embodiments (see FIG. 13). Instead of targets it uses multiple dynamic objects detected in the environment as correspondence points. The proposed approach for the extrinsic calibration of Li DAR and radar can be used isolated or in addition to the described combination of camera and LiDAR sensor data.

Figure 14:
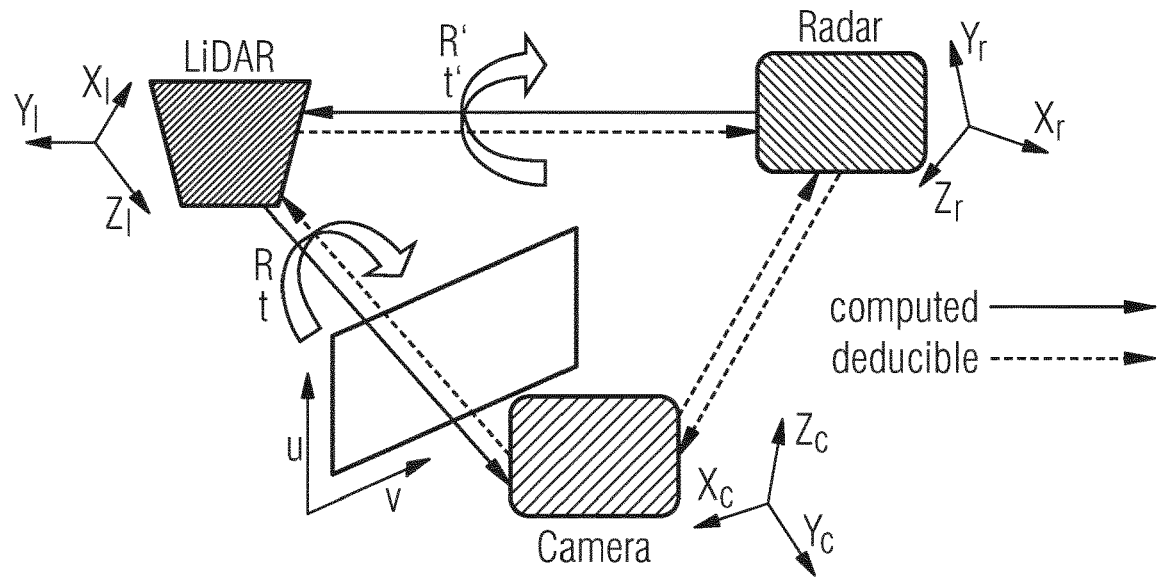
FIG. 14 illustrates the problem statement of extrinsic calibration of LiDAR, camera and radar, computing the extrinsic calibration between two sensors refers to estimating the rotation R(R') and translation t(t') between their coordinate systems, the extrinsics from LiDAR to camera and from radar to LiDAR are explicitly computed.

In the latter case, method 20 can further include providing radar data of the scene and projecting the radar data of the scene onto the image data and/or the projected depth data. Radar scans in a horizontal plane and provides only azimuth information in 2D coordinates. With 3D LiDAR points projected onto the 2D image plane, a transformation between the LiDAR and the radar coordinate systems can be determined by planar homography estimation. As shown in FIG. 14, the coordinates of LiDAR, image, and radar are ($X_l$, $Y_l$, $Z_l$), (u, v), and ($x_r$, $y_r$), respectively. Using homogeneous coordinates, the transformations between them can be described as $$\begin{bmatrix} u \\ v \\ 1 \end{bmatrix} = {}^I T_C \cdot {}^C T_L \cdot \begin{bmatrix} X_l \\ Y_l \\ Z_l \\ 1 \end{bmatrix}$$

for the LiDAR to image coordinate transformation (here ${}^I T_C = K$) and as $$\begin{bmatrix} u \\ v \\ 1 \end{bmatrix} = H \cdot \begin{bmatrix} x_r \\ y_r \\ 1 \end{bmatrix}$$

for the radar to image coordinate transformation, where H is the 3×3 homography matrix. It has 8 DOF and $h_{33}$ is set to 1. We can collect ($x_r$, $y_r$) and (u, v) correspondences from LiDAR and radar captured at the same time frame. These correspondences are coordinates of target objects (e.g., vehicles) with matching velocities. Each pair of corresponding ($x_r$, $y_r$) and (u, v) coordinates gives two linearly independent equations. We can use four corresponding data pairs and least squares estimation with algebraic distance to solve for H.

Next, we describe how to determine corresponding data pairs of ($x_r$, $y_r$) and (u, v). Radar provides both position and radial velocity measurements. Several measurements in forms of point data can be returned for one target object (e.g. vehicle). Based on the position and velocity, we can categorize the points into clusters such that one cluster corresponds to one target. Then, we can compute the centers of mass for each cluster. Thus, the radar data can be categorized into different radar data clusters based on position and velocity information extracted from the radar data, a respective center of mass can be computed for each radar data cluster. We do not rely on the other physical quantity measured by radar, e.g. radar cross section (RCS). RCS is a measure of how detectable an object is by radar, and is affected by many features including but not limited to target material, size, and angle. Hence, irrelevant objects such as stainless steel trash cans and manhole covers often have higher RCS values compared to target vehicles. Also, individual target vehicles have inconsistent RCS values due to changes in incident and reflected angles as the radar beams hit different parts of the cars. Our analysis shows that RCS is misleading in real urban scenarios.

Figure 15:
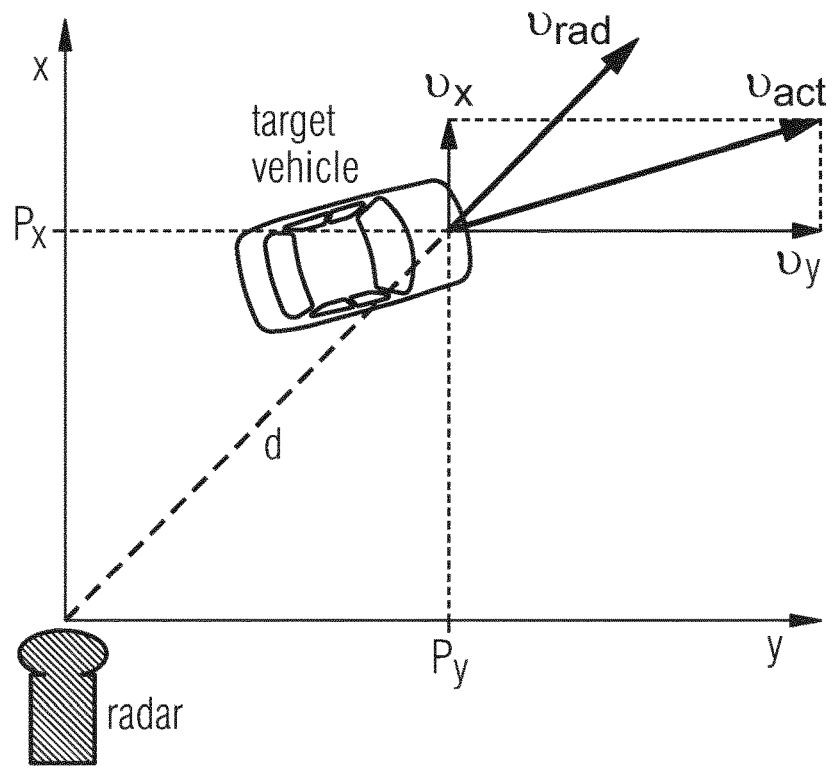
FIG. 15 illustrates measurements in LiDAR and radar coordinates, $v_{act}$ denotes the actual velocity of target vehicle, $v_{rad}$ denotes the radial velocity returned by radar, and $P_x$, $P_y$, $v_x$, and $v_y$ denote positions and velocities retrieved from LiDAR.

While velocity information is directly provided by radar through Doppler shift calculation, we can only estimate this property from the LiDAR PCs. For velocity estimation, we first extract clusters from LiDAR PCs in different time frames. Each cluster represents one target vehicle. Then, the clusters that belong to the same vehicle in consecutive time frames are integrated into one single track. A target velocity estimate can then be obtained from the position differences of cluster's center of mass between consecutive frames. Lastly, we convert these estimated velocities and positions into radial coordinates using $$d = \sqrt{P_x^2 + P_y^2}$$

$$V_{rad} = d' = \frac{P_x v_x + P_y v_y}{\sqrt{P_x^2 + P_y^2}}$$

to comply with the format of radar measurements. FIG. 15 illustrates measurements in LiDAR and radar coordinates, $v_{act}$ denotes the actual velocity of target vehicle, $v_{rad}$ denotes the radial velocity returned by radar, and $P_x$, $P_y$, $v_x$, and $v_y$ denote positions and velocities retrieved from LiDAR. The centers of mass of the LiDAR and radar clusters, whose velocities match each other, form corresponding data pairs for the homography estimation. Thus, different point clusters can be extracted from the depth data and each point cluster can be associated with a target object. The target object's velocity can be estimated based on the movement of the point cluster's center of mass between consecutive frames. The estimated target object's velocity can be compared with velocity information of a corresponding radar data cluster. Those target objects whose velocities match each other form corresponding data pairs for the homography estimation.

Figure 16:
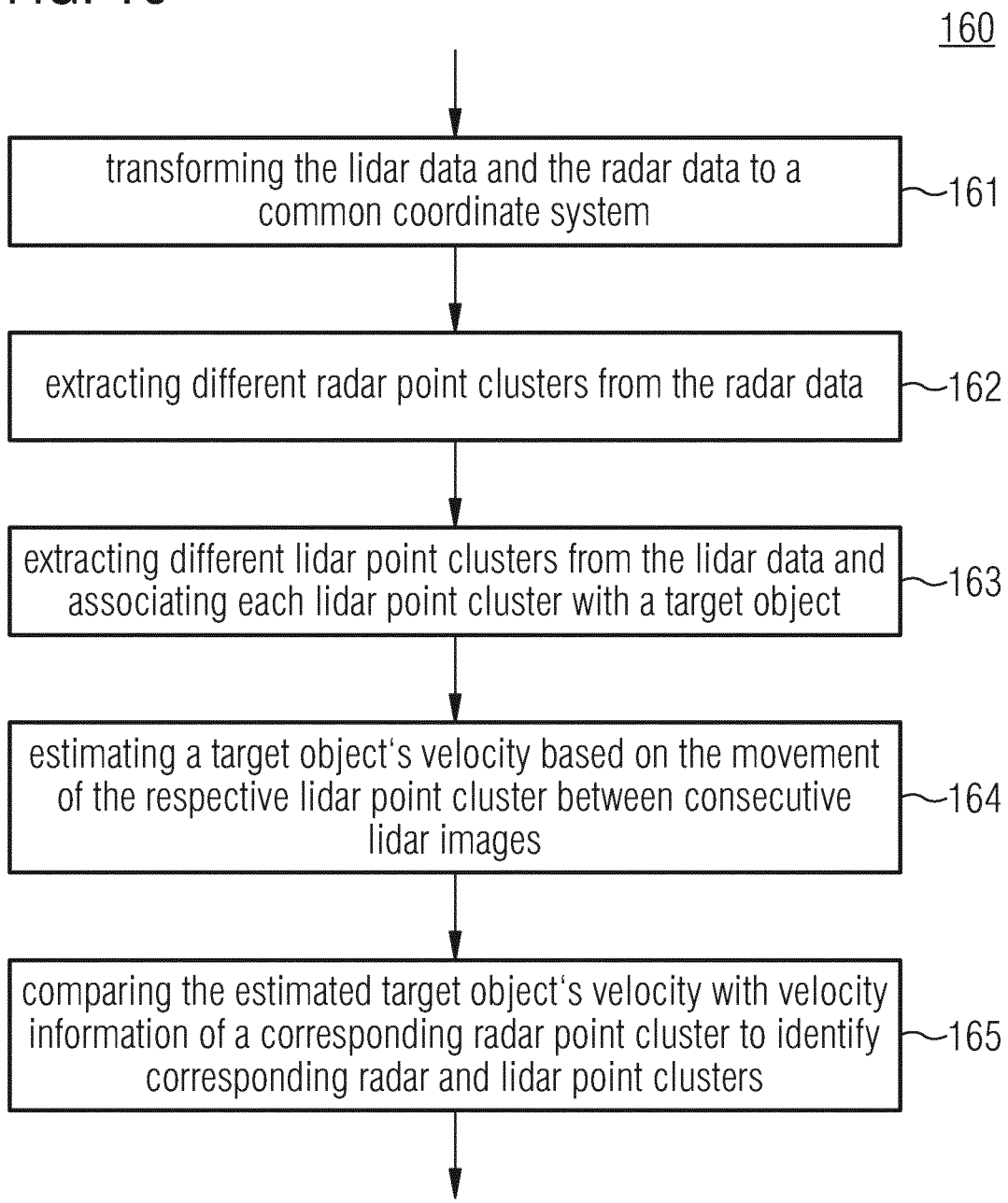
FIG. 16 is a flowchart of a method of object detection in a scene based on lidar data and radar data of the scene.

The example process described before is summarized in FIG. 16, showing a flowchart of a method 160 of object detection in a scene based on lidar (image) data and radar (image) data of the scene. The method 160 includes an act 161 of transforming the lidar data and the radar data to a common coordinate system, extracting 162 different radar point clusters from the radar data, an act 163 of extracting different lidar point clusters from the lidar data and associating each lidar point cluster with a target object, estimating 164 a target object's velocity based on the movement of the respective lidar point cluster between consecutive lidar images, and comparing 165 the estimated target object's velocity with velocity information of a corresponding radar point cluster to identify corresponding radar and lidar point clusters.

The skilled person having benefit from the present disclosure will appreciate that various embodiments of method 160 can be combined with various embodiments of method 20 of FIG. 2.

Figure 17:
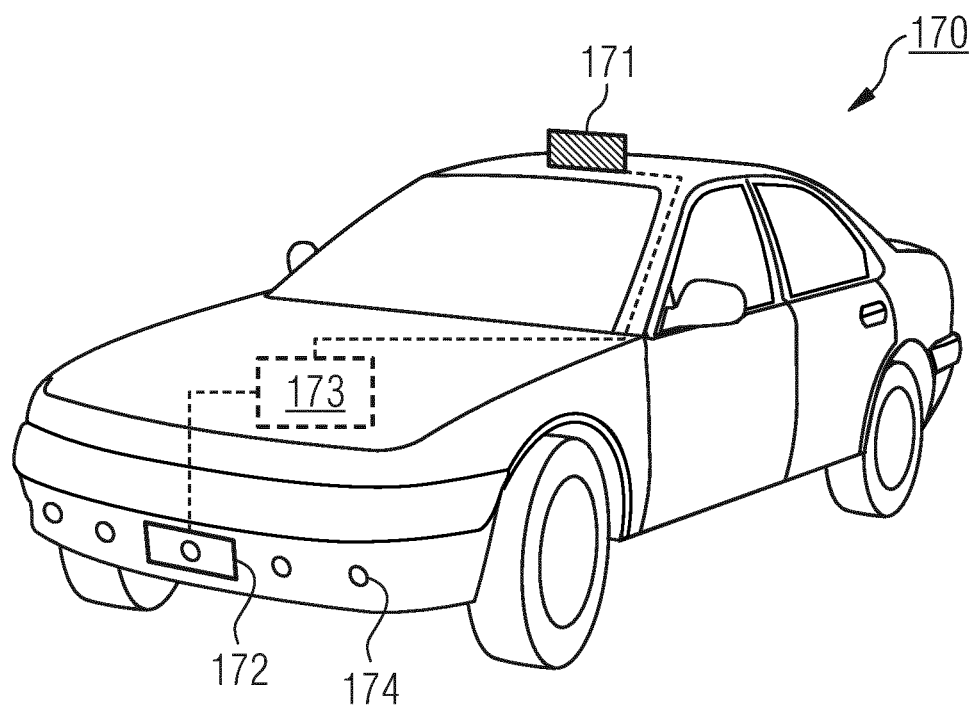
FIG. 17 shows a vehicle with camera, LiDAR, and radar sensors.

FIG. 17 shows a vehicle 170 comprising a LiDAR 171 to capture a depth image data of the vehicle's environment, a camera 172 to capture image data of the vehicle's environment. The vehicle 170 also comprises processing circuitry 173 configured to generate a projection of the depth image data onto the image data, and to encode the projection of the depth image data to multi-channel information to generate an encoded projection of the depth image data. The processing circuitry 173 comprises one or more convolutional neural networks configured to detect or classify objects in the vehicle's environment based on the image data and the encoded projection of the depth image data. Optionally, the vehicle 170 can also comprise one or more radar sensors 174. In this case, the processing circuitry 173 can additionally be configured to transform lidar image data and radar image data to a common coordinate system, to extract different radar point clusters from the radar image data, extract different lidar point clusters from the lidar image data and associating each lidar point cluster with a target object, estimate a target object's velocity based on the movement of the respective lidar point cluster between consecutive lidar images, and to compare the estimated target object's velocity with velocity information of a corresponding radar point cluster to identify corresponding radar and lidar point clusters.

To summarize, some embodiments of the present disclosure propose using early-fused datasets to generate elaborate feature maps using deep neural networks relevant for the particular sensor data (e.g. dense/sparse) to encode proper representation of a scene. This multisensory representation can be fused at some middle convolutional layers to preserve better localization and also better classification accuracy.

Further, instead of using inconsistent RCS values radar fusion technologies, the present disclosure proposes to rely on velocity returns from the radar and also track deterministically and estimate object velocities in LiDAR point cloud. This can result in correct object tracking and localization and therefore in robust fusion between radar and LiDAR. This process is lightweight and can also run real-time with the other existing camera-LiDAR fusion pipelines.

The aspects and features mentioned and described together with one or more of the previously detailed examples and figures, may as well be combined with one or more of the other examples in order to replace a like feature of the other example or in order to additionally introduce the feature to the other example.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F) PGAs), programmed to perform the acts of the above-described methods.

The description and drawings merely illustrate the principles of the disclosure. Furthermore, all examples recited herein are principally intended expressly to be only for pedagogical purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A functional block denoted as "means for . . . " performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a signal", "means for generating a signal", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software, but may include digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown.

Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. A method of object detection in a scene based on lidar data and radar data of the scene, the method comprising:
   transforming the lidar data and the radar data to a common coordinate system;
   extracting different radar point clusters from the radar data;
   extracting different lidar point clusters from the lidar data and associating each lidar point cluster with a respective target object;
   estimating a target object's velocity based on the movement of the respective lidar point cluster between consecutive lidar images; and
   comparing the estimated target object's velocity with velocity information of a corresponding radar point cluster to identify corresponding radar and lidar point clusters by comparing a velocity of the center of mass of a lidar point cluster with a velocity of the center of mass of a radar point cluster.

2. The method of claim 1, further comprising:
   detecting an object if a difference between the velocities of corresponding lidar and radar point clusters is below a predefined threshold.

3. The method of claim 1, further comprising:
   providing a camera data of the scene;
   projecting the lidar data onto the camera data to generate projected lidar data;
   encoding the projected lidar data to multi-channel information to generate encoded projected lidar data; and
   feeding the camera data and the encoded projected lidar data into one or more convolutional neural networks configured to detect or classify objects in the scene based on the camera data and the encoded projected lidar data.

4. The method of claim 3, further comprising:
   feeding the camera data and the encoded projected lidar data into at least one common convolutional layer of a convolutional neural network to learn image features; and
   feeding the learned image features into at least one fully connected layer of the convolutional neural network to detect or classify objects in the scene.

5. The method of claim 3, further comprising:
   feeding the camera data and the encoded projected lidar data into respective separate convolutional neural networks to learn separate features;
   joining the learned separate features; and
   feeding the joined features into a common convolutional neural network to detect or classify objects in the scene.

6. The method of claim 3, wherein encoding the projected lidar data comprises encoding respective depth values into three-channel color information to generate the encoded projected lidar data.

7. The method of claim 3, wherein encoding the projected lidar data comprises encoding respective depth values into three channels comprising horizontal disparity, height above ground, and angle to gravity to generate the encoded projected lidar data.

8. The method of claim 3, wherein projecting the lidar data onto the camera data comprises generating a transformation matrix comprising a rotation and translation portion for transforming a coordinate system of the lidar data onto a coordinate system of the camera data.

9. The method of claim 8, wherein generating the transformation matrix comprises determining the transformation matrix T maximizing the expression:

$$S(T) = \sum_{f=1}^{N} \sum X_i^f(T) \cdot E_i^f$$

wherein N denotes a number of images, i denotes the i-th pixel in a lidar point cloud $X_i^f$, and $E_i^f$ denotes the i-th pixel in an edge image E derived from the camera data.

10. An apparatus for object detection in a scene based on lidar data and radar data of the scene, the apparatus comprising:
    processing circuitry configured to:
      transform the lidar data and the radar data to a common coordinate system;
      extract different radar point clusters from the radar data;
      extract different lidar point clusters from the lidar data and associating each lidar point cluster with a respective target object;
      estimate a target object's velocity based on the movement of the respective lidar point cluster between consecutive lidar images; and
      compare the estimated target object's velocity with velocity information of a corresponding radar point cluster to identify corresponding radar and lidar point clusters by comparing a velocity of the center of mass of a lidar point cluster with a velocity of the center of mass of a radar point cluster.

11. A vehicle, comprising:
    a lidar to capture lidar data of the vehicle's environment;
    a radar to capture radar data of the vehicle's environment; and
    processing circuitry configured to:
      transform the lidar data and the radar data to a common coordinate system;
      extract different radar point clusters from the radar data;
      extract different lidar point clusters from the lidar data and associating each lidar point cluster with a respective target object;
      estimate a target object's velocity based on the movement of the respective lidar point cluster between consecutive lidar images; and
      compare the estimated target object's velocity with velocity information of a corresponding radar point cluster to identify corresponding radar and lidar point clusters by comparing a velocity of the center of mass of a lidar point cluster with a velocity of the center of mass of a radar point cluster.

* * * * *